United States Patent
Clinton

[11] 3,800,587
[45] Apr. 2, 1974

[54] THREE-SPHERE PROVER INTERCHANGE
[75] Inventor: William D. Clinton, Tulsa, Okla.
[73] Assignee: Signet Controls, Inc., Tulsa, Okla.
[22] Filed: Sept. 29, 1972
[21] Appl. No.: 293,445

[52] U.S. Cl. ................................................ 73/3
[51] Int. Cl. ........................................... G01f 25/00
[58] Field of Search .......................... 73/3; 335/153

[56] References Cited
UNITED STATES PATENTS

| | | | |
|---|---|---|---|
| 3,643,489 | 2/1972 | Davis et al. | 73/3 |
| 3,720,089 | 3/1973 | Davis et al. | 73/3 |
| 3,224,247 | 12/1965 | Barrett, Jr. | 73/3 |
| 3,412,391 | 11/1968 | Ward | 335/153 X |
| 3,232,090 | 2/1966 | Walker | 73/3 |

Primary Examiner—Richard C. Queisser
Assistant Examiner—Daniel M. Yasich
Attorney, Agent, or Firm—Head & Johnson

[57] ABSTRACT

This invention describes improvements in the conventional three sphere type meter prover systems. The improvements lie first in the use of a piston to force the prover spheres through the squeeze tube of the interchange and the provision of means attached to the piston rod to support the spheres when the piston rod is extended, and to prevent the spheres from accidentally dropping in back of the push plate. A second improvement is in the use of indicator means to indicate the position of the piston rod and the push plate which is used to force the spheres through the squeeze tube of the interchange.

6 Claims, 3 Drawing Figures

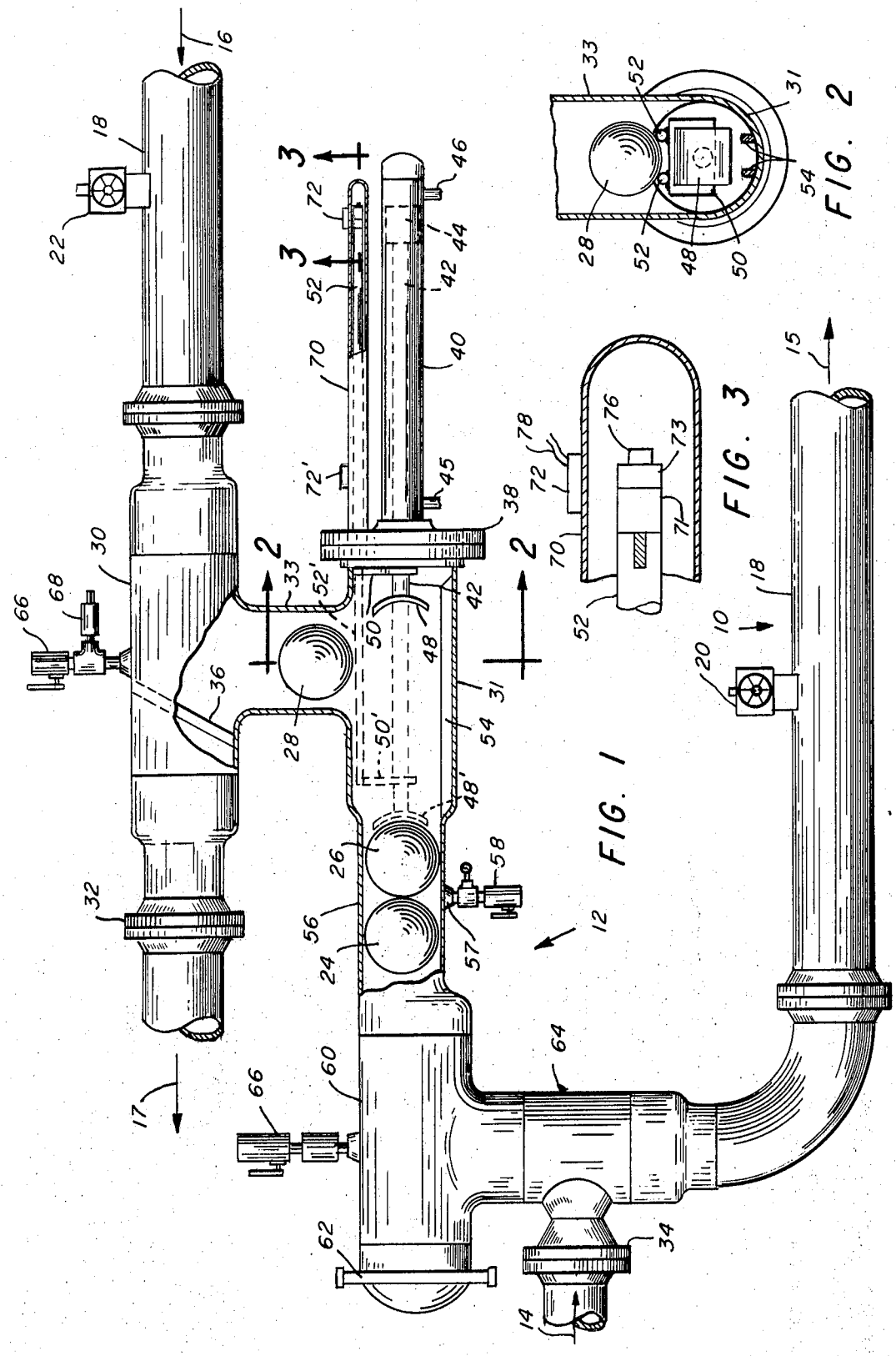

3,800,587

THREE-SPHERE PROVER INTERCHANGE

CROSS REFERENCE TO RELATED APPLICATION

This application is related to U.S. Pat. No. 3,720,089 issued Mar. 13, 1973, in the name of Billy E. Davis and Ronald G. Dunegan, entitled: DOUBLE BALL METER PROVER SYSTEM.

BACKGROUND OF THE INVENTION

This invention relates to the field of liquid metering devices. More particularly, it relates to the art of calibration of liquid flow meters. Still more particularly, it relates to the design of meter provers for calibrating liquid flow meters in the environment in which they are used.

For many years in the petroleum industry crude oil produced in the field was conveyed from the producing well by pipeline gathering systems to storage tanks. Such storage tanks also served as metering tanks. The measure of the volume of crude oil being delivered to the purchaser was determined by measurements of the tank, and of the depth of liquid in the tank before and after the delivery.

In recent years a trend has developed toward the use of liquid flow meters to measure the quantity of crude oil that is transferred. Since the value of the crude oil is high and very large volumes are involved, the accuracy of the meters by which the crude oil is measured is extremely important. A small inaccuracy in the meter can, in a relatively short time, result in a substantial dollar amount of over or under-payment for the crude oil delivered. For these reasons it has become important to provide means for accurately calibrating liquid flow meters. It is particularly important that means be provided wherein calibration can be accomplished in the environment in which the meters are used.

It has been customary in recent years to calibrate meters by moving a piston, whether in the form of a cylindrical device or a ball or a sphere, along a barrel of uniform diameter. These devices operate on the basis that a precise and predetermined amount of fluid flow is required to move a piston within such a barrel between two spaced points. Liquid is passed through the meter being calibrated, and through the calibrated barrel, affording means for comparison of the meter indication during the time of the passage of the piston from one point to another in the barrel. This arrangement has proved exceedingly satisfactory and is the premise upon which the present invention is founded.

One of the problems that has been encountered in the prior art type of calibrating barrel, or piston prover, is that of switching the liquid flow so as to pass liquid through the barrel during calibration procedures. In each of the prior art devices, some valving arrangement is required to switch the liquid flow so as to pass the flow through the calibrating barrel during proving of the meter, and to bypass the calibrating barrel during other times when the meter is not being proved. These valving arrangements consist generally of manifolding a plurality of valves or utilizing a single multi-port valve. In either instance the expense of valving constitutes a substantial portion of the expense of providing a meter prover. In addition, in order to assure the absolute accuracy of the provers it is required that such valving systems have no leakage whatsoever. Thus, the quality of valves utilized must be high. This further increases the expense of such valving arrangement.

SUMMARY OF THE INVENTION

This invention overcomes the difficulties and weaknesses of the prior art devices by providing a calibrating barrel which is particularly useful in proving meters, and which obviates the need for fluid switching valving arrangements. In this invention a U-shaped barrel is provided with a bypass, or ball or sphere return conduit, or interchange, connecting from the outlet to the inlet of the prover barrel. A short section of this bypass, called a squeeze tube, is of slightly smaller diameter than the barrel, so that a seal ball or sphere in this section will fit tightly enough that the fluid pressure in the system will not move it. Thus, flow through the bypass is fully blocked so long as one or more balls are in this section. All fluid flowing through the meter will therefore pass through the barrel. There must be at least one seal ball in the bypass at all times. Seal balls, after being introduced into the barrel, and passing through the barrel, are guided back into the bypass or interchange, and are forced through the reduced diameter squeeze section by mechanical means, such as a piston and hydraulic cylinder.

One of the difficulties that has existed is that need has been found to hold a ball or sphere by means of a gate until it is ready to drop into the inlet of the prover barrel. In this invention such a gate is not required but means are provided which are attached to the piston rod, so that as the returning ball moves into the bypass it rests on top of an elongated piston rod and therefore is automatically dropped into the squeeze tube of the bypass when the piston is retracted completely.

The same means, such as a pair of metal rods that in effect extend the push plate for a considerable axial length, are guided into a tubular housing, and by magnetic or other means, indicators can be used to determine the position of the rods and therefore the position of the push plate.

It is therefore a principal object of this invention to provide an improved calibrating barrel of the type useful in calibrating liquid flow meters.

A more particular object of this invention is to provide an improved three sphere interchange, or bypass, which is simpler and more positive than the prior art types.

It is a still further object to provide indicator means external of the interchange to indicate the precise position of the push plate which is used to force the metering balls through the squeeze tube of the interchange, and into the inlet of the prover barrel.

BRIEF DESCRIPTION OF THE DRAWINGS

FIG. 1 represents a portion of a barrel type meter prover which illustrates in full detail the interchange or bypass portion.

FIG. 2 is a partial sectional view taken along the line 2—2 of FIG. 1.

FIG. 3 is a partial sectional view taken along the line 3—3 of FIG. 1.

DESCRIPTION OF THE PREFERRED EMBODIMENT

Referring now to the drawings, and in particular to FIG. 1, the numeral 10 indicates generally the metering barrel of the meter prover, while numeral 12 indicates generally the interchange or the bypass section of the meter prover. The inlet liquid to the meter prover is indicated by arrow 14 and enters through a flanged coupling 34 to the launch section of the interchange 12. Normally, liquid flow extends from the flange 34 in the tee 64, downwardly through the barrel 18 past a first ball detector switch 20, through the barrel in accordance with arrow 15 and returning from the barrel according to arrow 16, through the pipe 18 past a second ball detector switch 22, through the pipe 30, flange 32 and into the pipeline in accordance with arrow 17.

The interchange or bypass portion includes the tee 30 which connects to a second tee 31 by means of a short pipe section 33, then to a neck portion or squeeze tube 56 which is of a diameter slightly smaller than the barrel 18, so that the spheres such as 24, 26 and 28 are a press fit into the tube and the resistance to movement is sufficiently high that the fluid pressure in the barrel will not cause the spheres to move through the tube. The only way these spheres can be moved through the squeeze tube is by means of a piston 44 in a hydraulic cylinder 40. The piston is attached to a piston rod 42 which is attached to a push plate 48. The piston rod is sealed through the flange 38. As hydraulic pressure is applied to the inlet 46 of the cylinder, the piston moves to the left and can press the spheres into and through the tube portion 56. Attached to the piston rod 42 behind the push plate 48 is a vertical plate 50 to which are fastened a pair of spaced rods 52. These are horizontal and parallel to the piston rod. They are arranged in such a position that as the piston rod moves to the left any sphere that is returned from the pipe 18 and falls into the tubular portion 33, will remain supported on top of the rods 52 until the piston rod and push plate 48 are fully retracted. In that case, the sphere 28 will drop into the tee portion 31, and will rest on the centering rails 54 so that when the piston 44 is again energized, it will push the third ball 28 into the tube 56. Because of the geometry, there is only space in the tube 56 for two balls. When the third ball 28 is pushed into contact with the ball 26, and both balls 28 and 26 are pushed forward, the third ball 24 will be pushed through the tube and it will drop into the tee 60, down into the tee 64 and into the barrel 18. The liquid flow 14 will carry the ball 24 through the barrel 18, returning it to the tee 30, where it will drop back into the tee 31, and be ready to be pushed into the tube portion 56 whenever it is desired to have a ball pass through the prover barrel.

One or more rods 36 are welded across the end of the tee 30 so that while fluid can flow in accordance with arrows 16 and 17 from the barrel 18 through the tee 30 and flange 32 and into the pipeline, a sphere which returns from the barrel is held back by the rods 36, and will drop into the bypass tube 33. An access gate 62 is provided for entry into the bypass unit. In normal operation this gate is closed. Also a short pipe 57 is inserted into the squeeze tube portion 56, and has a valve 58 attached. This tube enters in the space between the two spheres 24 and 26. If the spheres 24, 26, 28 are of the proper diameter, and are sealed tightly inside of the tube portion 56, there will be no liquid flow through the valve 58 when it is opened. Thus, the flow through the valve 58 can be used as an indication that the seal of liquid through the bypass, by means of the spheres inside the tube portion 56 is complete. Therefore the accuracy of the flow measurement is not to be questioned by thought of possible leakage through the bypass.

The detector switches 20 and 22 are used to determine the times of passage of a sphere through the barrel. These are conventional and need no further explanation or description.

FIG. 2 represents a partial section through the bypass along the line 2—2 of FIG. 1. Here it is seen how the sphere 28 rests on the two ball retaining bars or rods 52 when the piston is extended, and the push plate 48 is in the position shown dashed as 48'. At the same time the plate 50 is in the position 50' and the rods 52 are in the position 52' in FIG. 1. When the piston rod 42 is retracted and the push plate moves back to 48, then any sphere passing through the barrel will drop down onto the centering rails 54 so that on the next movement of the piston, the ball can be pushed into the tube portion 56.

FIG. 3 illustrates an enlarged detail of FIG. 1, along the line 3—3. The rod 52 extends from the plate 50 and is guided into a tubular housing 70 which is made of a nonmagnetic material such as aluminum, brass, or stainless steel. The housing 70 must be strong enough to stand the liquid pressure in the prover. On the end of the rod 52 is a nonmagnetic spacing cylinder 71 and a ceramic or other type of permanent magnets 73. These are held to the rod 52 by screw 76. The flux of the magnet 73 will extend outward from the magnet, outside of the tube 70, where it will affect a small magnetic reed switch 72. Thus, when the rod 52 is in the retracted position, the field of the magnet 73 will operate the reed switch 72 and will close the circuit between the leads 78 so that an indicator will show that the rod is fully retracted. Also, additional switches such as 72' can be placed at other points along the housing 70 to indicate the presence of the magnet 73 at these other positions. These switches will indicate the precise position of the rod 52, which is itself a measure of the position of the piston 44.

Vent means 64 and 66 are provided and a pressure relief 68 is also provided to prevent damage due to excessive pressures in the system.

The important new features of this invention lie in the rods 52 which are attached to the piston rod so that when the piston rod is extended and the push plate has moved into the tube portion 56, any sphere that returns from the barrel will drop into the tube 33 and will rest on top of the rods 52 until the piston is again retracted. So the rods not only provide a convenient means for ensuring that the third ball does not drop into the tee 31 until it is desired to have the ball dropped. At such time the piston rod is retracted and is then driven forward, pushing the ball 28 into the tube 56 and forcing the ball 24 out of the tube and into the inlet of the prover barrel. Detector means on the rods 52 will show the position of the piston.

While the invention has been described with a certain degree of particularity it is manifest that many changes may be made in the details of construction and the arrangement of components. It is understood that the invention is not to be limited to the specific embodiments herein by way of exemplifying the invention, but the invention is to be limited only by the scope of the attached claim or claims, including the full range of equivalency to which each element or step thereof is entitled.

What is claimed is:

1. In a three ball meter prover interchange having a bypass section with a squeeze tube; and ram means for pressing said spheres into and through said squeeze tube, including piston, piston rod and push plate; the improvement comprising:
   a. sphere catcher means attached to, positioned above, and movable with, said piston rod, said catcher means, when said piston rod is extended, serving to hold said balls above said piston rod;
   b. nonmagnetic housing means attached externally to said bypass section for slidably receiving a portion of said sphere catcher means; and
   c. means on said non-magnetic housing means to indicate the longitudinal position of said sphere catcher means, and of said piston rod.

2. The meter prover interchange as in claim 1 in which said sphere catcher means comprises at least one rod mounted above, parallel to, and attached to said piston rod.

3. The meter prover interchange as in claim 2 in which said housing is tubular and coaxial with said at least one rod.

4. The meter prover interchange as in claim 3 including permanent magnet means attached to said at least one rod, and at least one magnetic field detecting means on the outside of said housing.

5. The meter prover interchange as in claim 4 including a plurality of magnetic field detecting means spaced along said housing.

6. The meter prover interchange as in claim 2 in which said sphere catcher means comprises at least two spaced apart, parallel rods positioned above, parallel to, and attached to said piston rod.

* * * * *